UNITED STATES PATENT OFFICE.

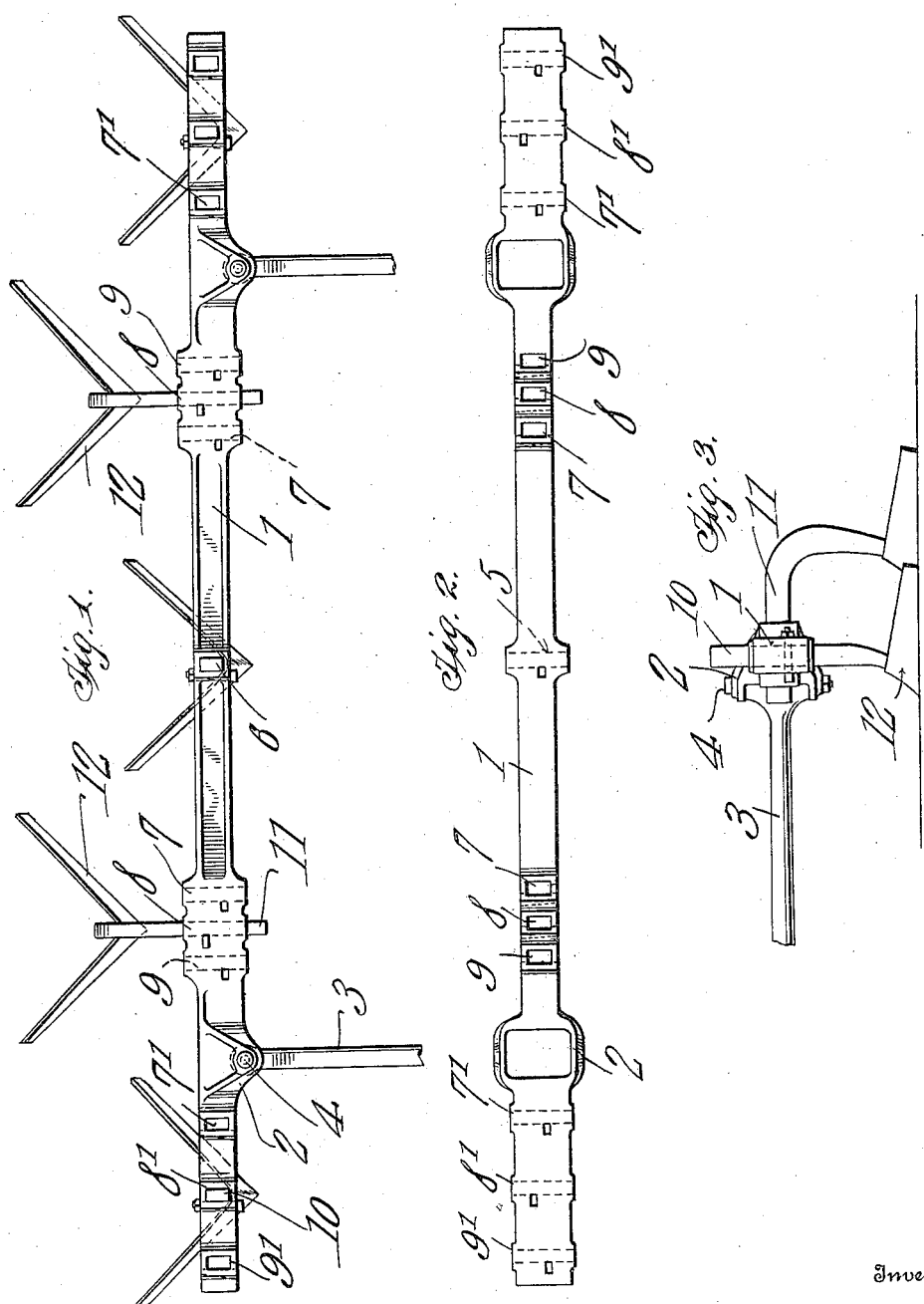

JOHN P. HORNER, OF LOCKHART, TEXAS.

COTTON-BLOCKING ATTACHMENT FOR CULTIVATORS.

949,795.  Specification of Letters Patent.  Patented Feb. 22, 1910.

Application filed October 22, 1909. Serial No. 524,024.

*To all whom it may concern:*

Be it known that I, JOHN P. HORNER, a citizen of the United States, residing at Lockhart, in the county of Caldwell and State of Texas, have invented a new and useful Cotton-Blocking Attachment for Cultivators, of which the following is a specification.

This invention has relation to cotton blocking attachments for cultivators and it consists in the novel construction and arrangement of its parts as hereinafter shown and described.

The object of the invention is to provide a simple attachment especially adapted to be applied to the beams of a sulky cultivator and adapted to be used for blocking cotton plants to a stand. The parts are so arranged upon the attachment that they may be adjusted to leave relatively broad or narrow blocks of standing plants as may be desired.

With the above object in view, the attachment consists of a bar having sockets adapted to receive the rear ends of the cultivator beams which are pivotally joined with the bar. The bar is provided at a point midway between its ends with an opening adapted to receive a standard upon which a cutting sweep is mounted. At opposite sides of the first said opening, the bar is provided with a series of openings also adapted to receive standards. The last said series of openings are located at points within the points of attachment of the cultivator beams. The bar is also provided in the vicinity of its ends with other series of openings adapted to receive standards and the openings in the last said series have peculiar relation to the openings in the first series. The openings of the outer series correspond in number to the openings of the inner series and each opening in the inner series is located exactly midway between its corresponding opening in the outer series and the opening at the point intermediate the ends of the bar. By such disposition of the openings in the bar it is possible to adjust the standard so that the sweep carried thereby will operate upon both sides of two blocks of plants and operate upon the inner sides of two outer blocks of plants and when the standards are adjusted in the corresponding openings in the inner and outer series the space between the ends of the sweeps throughout the series of sweeps is uniform.

In the accompanying drawings:—Figure 1 is a top plan view of the blocking attachment. Fig. 2 is a front elevation of the bar forming a component part of the blocking attachment. Fig. 3 is a side elevation of the blocking attachment.

The blocking attachment consists of a bar 1 having at its end portions sockets 2 adapted to receive the rear ends of cultivator beams 3. The said beams are pivotally attached to the bar 1 by means of bolts 4 which pass transversely through the upper and lower sides of the said sockets and through the said beams 3. The bar 1 is provided at a point midway between its ends with a vertically disposed opening 5 adapted to receive a standard 6. The bar is provided at points at opposite sides of the opening 5 with two inner series of openings of which the individual openings are designated as 7, 8, and 9. These inner series are located at points between the opening 5 and the socket 2 and the openings of the said inner series are horizontally disposed. The bar is also provided with outer series of openings which are designated individually as 7', 8', and 9'. The outer series of openings are located in the vicinity of the ends of the bar 1 and the openings 7' of the outer series correspond with the openings 7 of the inner series, the openings 8' of the outer series with the openings 8 of the inner series, and the openings 9' of the outer series with the openings 9 of the inner series. The openings in the outer series are vertically disposed. The openings in the outer series are adapted to receive standards 10 similar to the standards 6 while the openings of the inner series are adapted to receive standards 11 which have horizontal upper portions and approximately vertical rear portions as illustrated in Fig. 3. Mounted at the lower end of each standard is a sweep 12 and the sweeps of the entire series are of the same design and dimensions. The opening 7 is exactly midway between the opening 7' and the opening 5. The opening 8 of the inner series is exactly midway between the opening 8' and the opening 5. The opening 9 of the inner series is exactly midway between the opening 9' of the outer series and the opening 5. Thus when standards are placed in the openings 7', 7 and 5, the adjacent ends of the sweeps carried by the said standards in lines transversely across the line of draft are at the same distance from each other throughout the series of sweeps, and when the standards are arranged in the openings 8', 8 and 5, the adjacent ends of the sweeps are at a uniform distance from each other but at a distance different from that when the said standards are positioned in the openings 7', 7 and 5. In a like manner when the standards are positioned in the openings 9', 9 and 5, the ends of the sweeps are at uniform distances from each other but this distance is dissimilar from the distances between the ends of the sweeps when the standards are in the other openings as above noted. In other words, when the standards are arranged as indicated the intermediate standards are exactly midway between the middle standard and the outer standard. Thus it will be seen that a simple and an effective means is provided for varying the distance between the adjacent ends of the sweeps throughout the series of sweeps but the distance between the adjacent ends of the sweeps throughout each adjustment is uniform. Consequently the blocking device can be used to advantage for producing large or small blocks of standing plants.

Having described my invention what I claim as new and desire to secure by Letters Patent is:—

A cotton blocker comprising a bar having a standard opening at a point intermediate its ends, said bar having at the opposite sides of the said openings intermediate series of openings, said bar having in the vicinity of its end outer series of openings, the number of openings in which correspond with the number of openings in the intermediate series, each opening in the intermediate series being exactly midway between its corresponding opening in the outer series and the opening at the middle of the bar.

In testimony that I claim the foregoing as my own, I have hereto affixed my signature in the presence of two witnesses.

JOHN P. HORNER.

Witnesses:
    J. W. HARTSFIELD,
    R. W. JEFFREY.